United States Patent [19]
Sturgeon

[11] Patent Number: 5,959,856
[45] Date of Patent: Sep. 28, 1999

[54] DC-TO-DC POWER CONVERTER

[75] Inventor: Clayton L. Sturgeon, Frisco, Tex.

[73] Assignee: Magnetic Technology, Inc., Richardson, Tex.

[21] Appl. No.: 09/037,245

[22] Filed: Mar. 9, 1998

[51] Int. Cl.$^6$ .......................... H02M 7/44; H02M 3/335; H02M 7/5387
[52] U.S. Cl. ................................ 363/98; 363/17; 363/132
[58] Field of Search .................................. 363/16, 17, 95, 363/98, 131, 132

[56] References Cited

U.S. PATENT DOCUMENTS

| | | | |
|---|---|---|---|
| 4,748,532 | 5/1988 | Commander et al. | 363/98 |
| 4,758,941 | 7/1988 | Felton et al. | 363/132 |
| 5,014,182 | 5/1991 | Cohen | 363/17 |
| 5,500,792 | 3/1996 | Jeon | 363/98 |

*Primary Examiner*—Matthew Nguyen
*Attorney, Agent, or Firm*—Locke Liddell & Sapp LLP

[57] ABSTRACT

A dc-to-dc power converter for delivering continuous and controlled power to a load includes first and second controllable switching devices having a junction therebetween. Each of the first and second controllable switching devices include a parasitic gate to source capacitance, parasitic gate to drain capacitance, output capacitance and an intrinsic diode. First and second power supplies have a junction therebetween. A power transformer has a primary winding, a secondary winding and inductance in series with the primary winding. The secondary winding is connected to a rectifying circuit connected to the load to supply a controllable current to the load. The primary winding is connected between the junction between the first and second controllable switching devices and the junction between the first and second power supplies. A first drive circuit is connected to the first controllable switching device. A second drive circuit is connected to the second controllable switching device. A drive transformer has a primary winding and first and second secondary windings. The first secondary winding is connected to the first drive circuit, and the second secondary winding is connected to the second drive circuit. A control circuit is connected to the drive transformer primary winding for alternately actuating and deactuating the first and second drive circuits. The first and second controllable switching devices continuously deliver controllable power to the load.

5 Claims, 3 Drawing Sheets

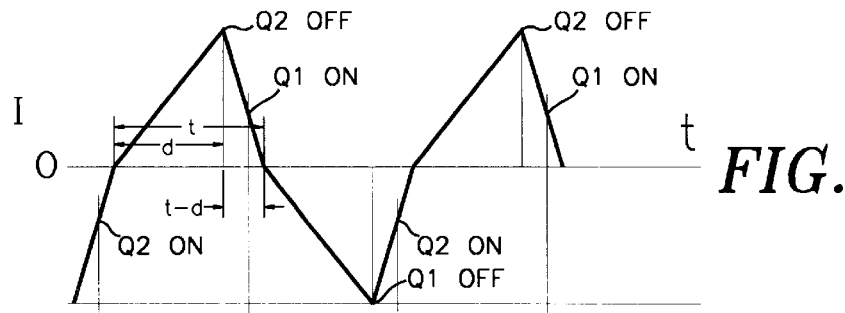
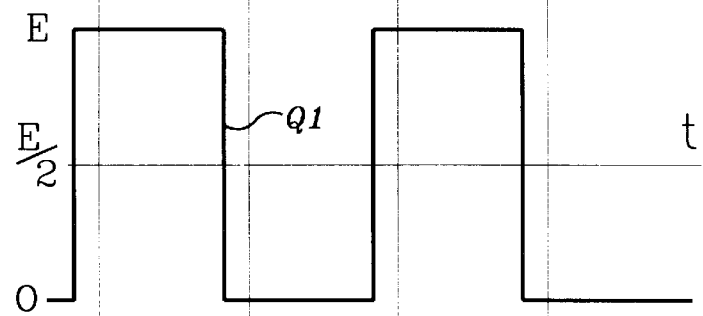
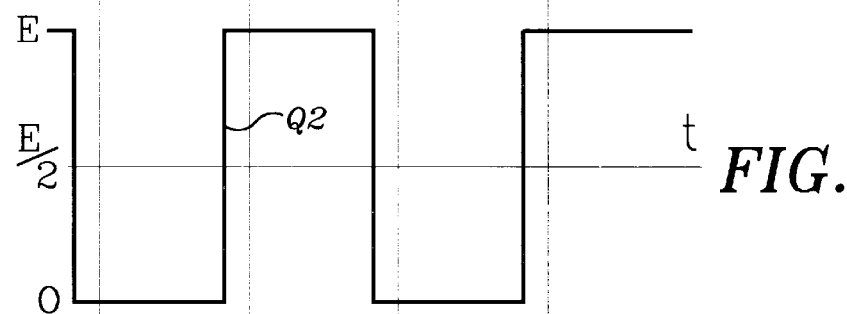
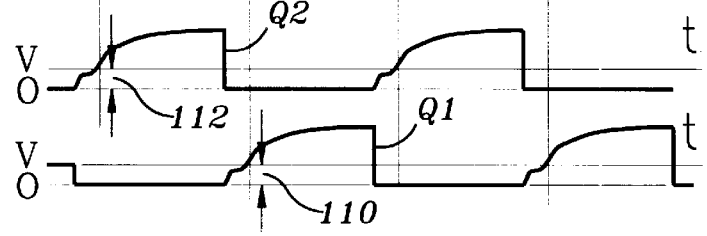
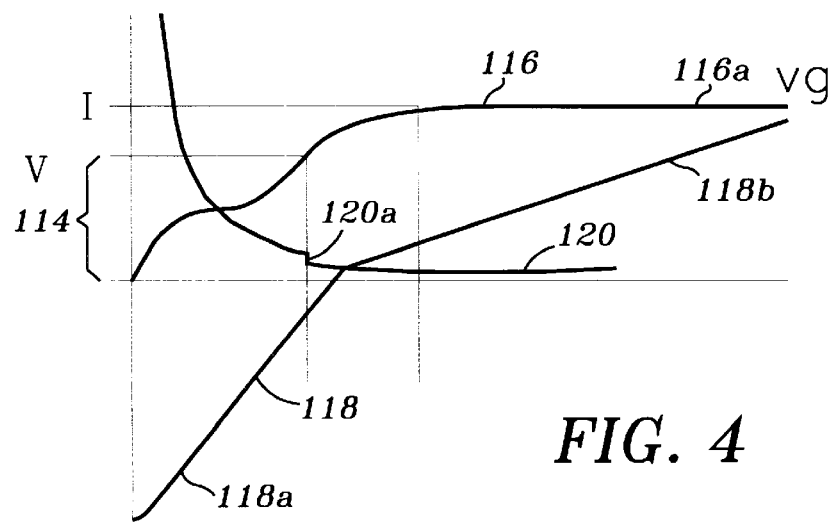

DC-TO-DC POWER CONVERTER

TECHNICAL FIELD OF THE INVENTION

The present invention relates to dc-to-dc power converters, and more particularly, to a converter for continuously delivering controllable power to a load.

BACKGROUND OF THE INVENTION

Many types of dc-to-dc converters are known in the art for converting a first dc voltage to a second, regulated dc voltage. Typically, the dc input voltage is converted to an ac voltage (or dc pulses) by a switching transistor or transistors. The ac voltage is then converted to a regulated dc output voltage. Feedback of the output voltage may be used to control the duty cycle or the frequency of the ac voltage to achieve the desired voltage regulation.

Switching converters are known to have a higher efficiency than other types of dc power supplies, such as series-regulated power supplies. However, the efficiency of switching converters is limited by losses in the switching transistor(s) during turn-on and turn-off, particularly in pulse-width modulated (PWM) converters. In addition, the switching transistor(s) must simultaneously withstand high current and high voltage during both turn-on and turn-off.

A goal of converter design is to reduce the transistor losses which degrade circuit efficiency and increase the cost of the converter.

Another goal of converter design is to reduce the size and weight. One proposed method of reducing the size and weight of the converter, while beneficially increasing the response time, is to increase the converter switching frequency. By increasing the switching frequency, a converter having smaller size, low weight, and faster response times can be obtained. The size and weight are decreased because the passive components required for operation at high frequency are smaller. However, the higher frequency switching aggravates transistor losses and degrades efficiency.

Switching devices normally utilized in switching power supplies are bipolar translators, thyristors or field effect transistors. Although these devices may be modeled as ideal switches, it is well known that a more accurate model includes the parasitic effects of the device. These parasitic components include diodes and capacitors whose effect on circuit operation may be minimized or ignored by proper design of the switching devices. Conversely, again by proper device selection or design, certain parasitic effects may be enhanced and beneficially employed in the operation of the circuit. Physical transformers also include nonideal parasitic elements which may be beneficially employed by proper design of the transformer and the switching circuit.

A need has thus arisen for a power converter having reduced manufacturing expense, size, and weight and which utilizes the parasitic capacitances of the switching devices of a switching circuit. By utilizing the parasitic capacitances of the switching devices, many of the discrete components of a switching converter which contribute to its size, weight and cost can be eliminated.

SUMMARY OF THE INVENTION

In accordance with the present invention, a dc-to-dc power converter for delivering continuous and controlled power to a load is provided. The converter includes first and second controllable switching devices having a junction therebetween. Each of the first and second controllable switching devices include a parasitic gate to source capacitance, parasitic gate to drain capacitance, output capacitance and an intrinsic diode. First and second power supplies have a junction therebetween. A power transformer has a primary winding, a secondary winding and inductance in series with the primary winding. The secondary winding is connected to a rectifying circuit connected to the load to supply a controllable current to the load. The primary winding is connected between the junction between the first and second controllable switching devices and the junction between the first and second power supplies. A first drive circuit is connected to the first controllable switching device. A second drive circuit is connected to the second controllable switching device. A drive transformer has a primary winding and first and second secondary windings. The first secondary winding is connected to the first drive circuit, and the second secondary winding is connected to the second drive circuit. A control circuit is connected to the drive transformer primary winding for alternately actuating and deactuating the first and second drive circuits.

The first drive circuit actuates the first controllable switching device, such that the first drive circuit begins to charge the effective parasitic gate to source capacitance of the first controllable switching device without reaching the gate to source voltage threshold until current through the inductance and the primary winding of the power transformer discharges the effective output capacitance of the first controllable switching device, and thereafter the intrinsic diode of the first controllable switching device begins to conduct. The second drive circuit actuates the second controllable switching device, such that the second drive circuit device begins to charge the effective parasitic gate to source capacitance of the second controllable switching device without reaching the gate to source voltage threshold until current through the inductance and the primary winding of the power transformer discharges the effective output capacitance of the second controllable switching device, and thereafter the intrinsic diode of the second controllable switching device begins to conduct. The first and second controllable switching devices thereby continuously delivering controllable power to the load.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 3a illustrates current waveforms for switching devices Q1 and Q2;

FIG. 3b illustrates the drain-to-source voltage waveforms for switching device Q1;

FIG. 3c illustrates the drain-to-source voltage waveforms for switching device Q2;

FIG. 3d illustrates the gate-to-source voltage waveforms for switching device Q2;

FIG. 3e illustrates the gate-to-source voltage waveforms for switching device Q1; and FIG. 4 illustrates a combined current and voltage waveform illustrating operation of the present drive circuit.

DESCRIPTION OF THE PREFERRED EMBODIMENTS

Figure 1:
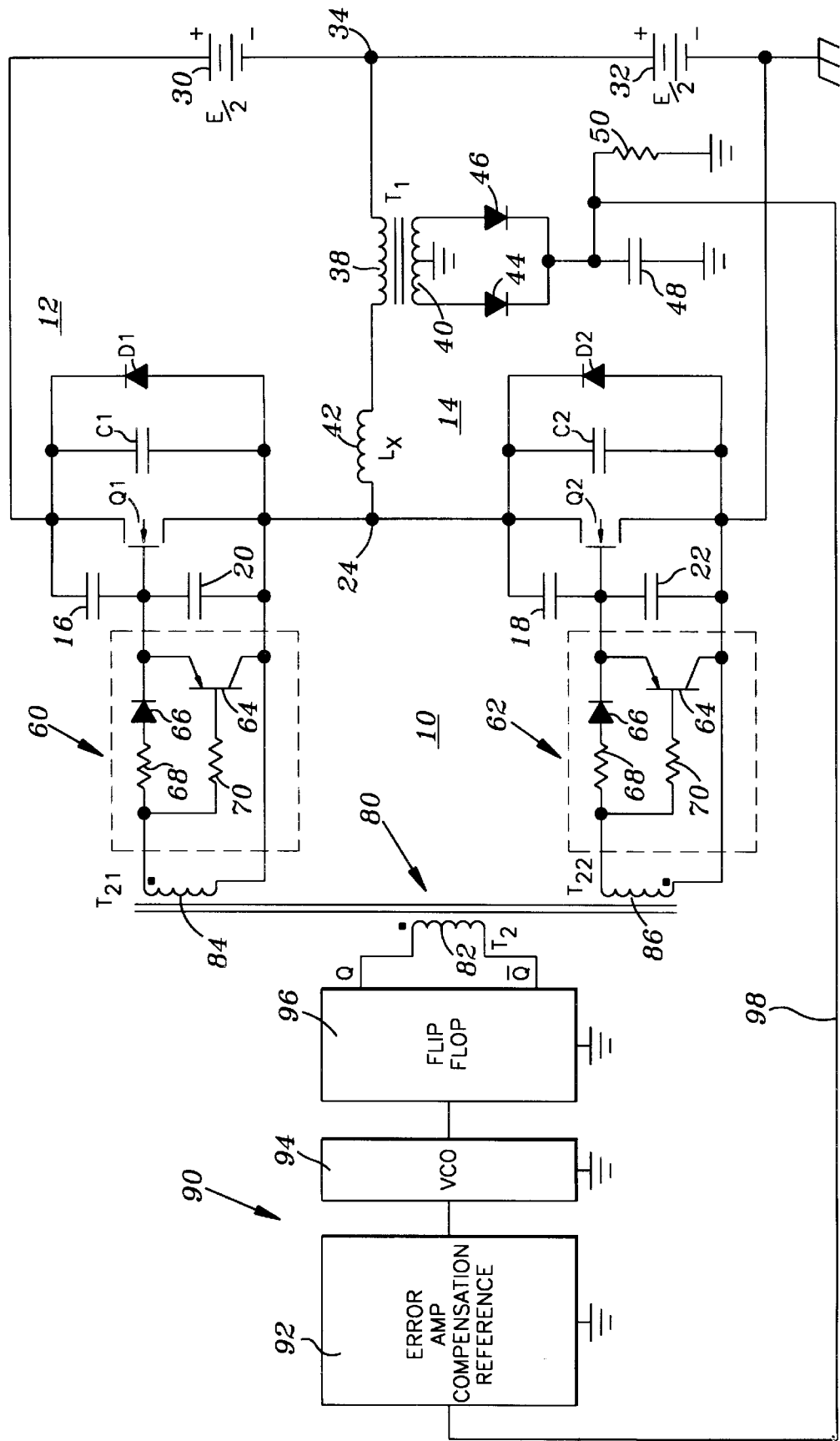
FIG. 1 is a schematic diagram of the present power converter illustrating the half bridge embodiment.

Referring to FIG. 1, the present dc-to-dc power converter is illustrated, and is generally identified by the numeral 10.

Converter 10 includes two switching devices, generally identified by the numerals 12 and 14. Switching devices 12 and 14 are also referred to herein as Q1 and Q2, and comprise, for example, controllable switching devices such as field effect transistors. Associated with each switching device 12 and 14 is an intrinsic diode D1 and D2, respectively. Also associated with each switching device 12 and 14 is an output capacitor C1 and C2, respectively. Capacitors C1 and C2 are connected across the drain and source of respective switching devices, Q1 and Q2. Also associated with switching devices Q1 and Q2 are parasitic capacitances 16 and 18 existing between the gate and drain of switching devices Q1 and Q2 as well as parasitic capacitances 20 and 22 existing between the gate and source of switching devices Q1 and Q2. Diodes D1 and D2 are intrinsic. An important aspect of the present invention is the utilization of the parasitic capacitances and the intrinsic diode associated with switching devices Q1 and Q2.

Switching devices Q1 and Q2 are interconnected at a junction 24. Switching devices Q1 and Q2 are powered from voltage sources 30 and 32 which are connected in series with the inductor 42, transformer T1, and switching devices Q1 and Q2. Voltage sources 30 and 32 are connected to form a junction 34.

Connected between junctions 24 and 34 is a power transformer T1. Power transformer T1 includes a primary winding 38 and a secondary winding 40. In series with primary winding 38 is an inductance 42, Lx. Inductance 42 may represent leakage inductance of power transformer T1 or may comprise a discrete inductive component. Secondary winding 40 of power transformer T1 is center tapped and is connected to a rectifying circuit including diodes 44, 46, and a capacitor 48 for delivering a controllable current to a load 50.

Switching devices Q1 and Q2 are actuated by drive circuits, generally identified by the numerals 60 and 62, respectively. Drive circuits 60 and 62 each include a transistor 64, diode 66, and resistors 68 and 70. Characteristic of drive circuits 60 and 62 is a slow or soft turn-on and a fast or hard turn-off to control operation of switching devices Q1 and Q2 and charging and discharging of capacitors 16, 18, 20, and 22.

Figure 2:
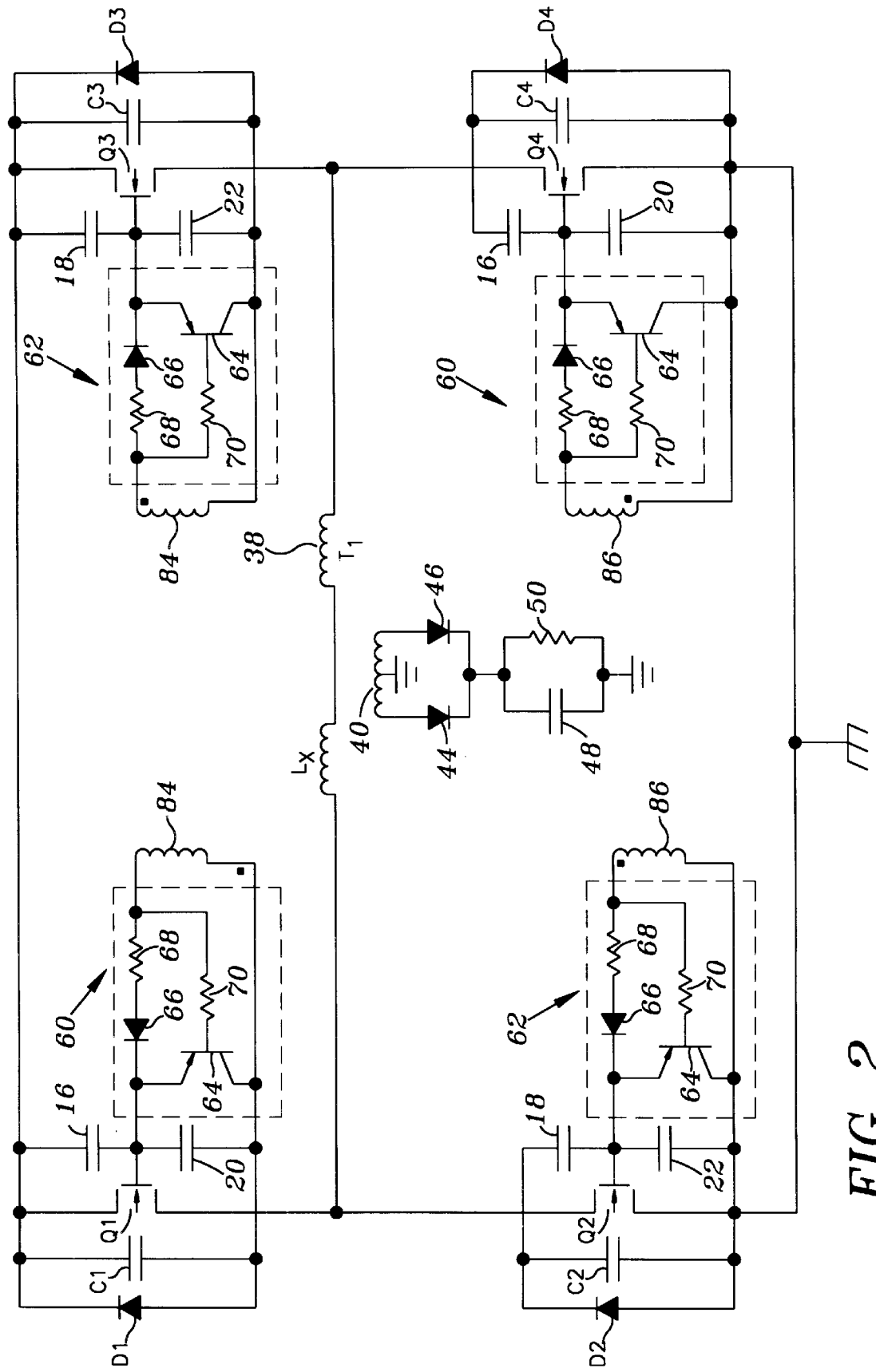
FIG. 2 is a schematic diagram of the present power converter illustrating an isolated full bridge embodiment of the present invention.

Drive circuits 60 and 62 are connected to a drive transformer, generally identified by the numeral 80. Drive transformer 80 includes a primary winding 82 and first and second secondary windings 84 and 86 which are connected, respectively, to first and second drive circuits 60 and 62. Connected to drive transformer 80 is a control circuit, generally identified by the numeral 90. Control circuit 90 includes an error amplifier, compensation, reference circuit 92, a voltage control oscillator 94, and a flip-flop 96. Control circuit 90 functions to generate a square wave output signal for alternately actuating and deactuating drive circuits 60 and 62. The respective gates of switching devices Q1 and Q2 are driven at a constant duty cycle of 0.5 or 50%. This method of control is through frequency modulation. Other control methods are possible, such as, for example, a constant frequency and constant duty cycle, while varying the input voltage to regulate the output voltage. It is further possible to combine frequency modulation at constant duty cycle and variation of the input voltage simultaneously to regulate the output. Pulse width modulation is not utilized with the present invention. The present invention, in the full bridge embodiment as shown in FIG. 2 may also be utilized as a power factor corrector where the input capacitance is small and frequency modulation is used. The power factor corrector mode is isolated and regulated. The input voltage in this embodiment is the full wave rectified line voltage and the output is ideally much lower than the peak rectified line voltage input.

Feedback is provided from the output of power transformer T1 to error amplifier compensation reference 92 via signal line 98.

Referring simultaneously to FIGS. 1 and 3, the present converter operates such that the first drive circuit 60 actuates switching device Q1, while Q2 is off. The drive circuit 60 begins to charge the effective parasitic gate to source capacitance 20 of Q1 without reaching the gate-to-source voltage threshold of Q1 (FIG. 3e) until current through inductance 42 and primary winding 38 of power transformer T1 discharges the effective output capacitance C1 of Q1, and thereafter intrinsic diode D1 of Q1 begins to conduct (FIG. 3a). Similarly, when Q1 is off, and Q2 is on, drive circuit 62 actuates Q2, such that drive circuit 62 begins to charge the effective parasitic gate-to-source capacitance 22 of Q2 without reaching the gate-to-source voltage threshold (FIG. 3d) until the current through inductance 42 and primary winding 38 of transformer T1 discharges the effective output capacitance C2 of Q2, and thereafter intrinsic diode D2 of Q2 begins to conduct (FIG. 3a). The gate-to-source threshold voltage in order to turn on Q1 and Q2 is illustrated in FIGS. 3e and 3d, respectively, and shown by the voltage levels indicated by reference numerals 110 and 112. The threshold voltage is also indicated in FIG. 4 by reference numeral 114. Voltage waveform 116 in FIG. 4 represents the threshold voltage to turn on a switching device Q1 or Q2. Full turn on is shown at reference numeral 116a. Waveform 118 is the representation of current through device Q1 or Q2. The drain voltage is illustrated by waveform 120. The negative drain current completely discharges the effective drain to source capacitance before Q1 or Q2 threshold is reached. Therefore, when Q1 or Q2 turns on, it does not discharge this capacitance, thus avoiding the dissipation that would occur. Also, since the drain current rises as a ramp from zero due to inductance, Lx, Q1 or Q2 is always saturated when the drain current is positive, avoiding the high dissipation linear region of operation. Thus, a soft turn-on is always possible since the drain current increases as a ramp from zero and does not require the gate voltage to be high initially. The decrease in negative drain current is illustrated at waveform 118a, and the increase in positive drain current is illustrated at waveform 118b. The maximum gate voltage of Q1 and Q2 is illustrated at reference numeral 116a. Q1 and Q2 are saturated in the area of waveform 120 indicated by reference numeral 120a.

The present invention utilizes all of the parasitics of switching devices Q1 and Q2 and power transformer T1 to advantage, while negating the undesirable effects these parasitics cause in previously developed pulse width modulation and resonant converters. The present invention results in a simple, low part count and therefore low cost, efficient, small-sized converter. To achieve an important benefit of the present invention, a soft turn-on and fast turn-off of Q1 and Q2 is accomplished. As previously stated, control circuit 90 functions to actuate drive circuits 60 and 62. The frequency of voltage controlled oscillator 94 is controlled and fed to a flip-flop 96 to obtain a 50% duty cycle square wave. This waveform is fed to drive circuit 60 and 62 in proper phase utilizing transformer 80. The present invention operates as an isolated half-bridge as shown in FIG. 1, or a full-bridge circuit as illustrated in FIG. 2. FIG. 2 illustrates an isolated full-bridge embodiment utilizing switching devices Q1, Q2, Q3 and Q4 and associated capacitors and diodes, C3, C4, D3, and D4. Switching devices Q1 and Q4 are actuated simultaneously while switching devices Q2 and Q3 are off. Similarly, Q2 and Q3 are on while switching devices Q1 and Q4 are off. The full-bridge embodiment operates in a manner similar to the half-bridge embodiment of FIG. 1 as previously described. The present invention allows for high power, greater than 2500 watts or low power, less than 100 watts at efficiencies near or greater than 96% at an output voltage from 2.7 volts.

The present invention produces low EMI and RFI due to the lack of abrupt voltage and current changes. No energy consuming snubbers are needed thereby further lowering the number of components required in the present converter while increasing the efficiency. The parasitics of the transistors Q1 and Q2 provide this function naturally, and further reduce the EMI-RFI that must be dealt with. Also, frequency modulation is much less subject to noise interference in the high gain control circuit than pulse width modulation.

Transformer magnetizing inductance plays no role in the operation of the present converter so that no gap is necessary and high permeability low loss ferrite cores may be used. The magnetizing inductance will be large so that it can be neglected. It is also important to note that as the current in inductance Lx is discharging and charging the effective drain-to-source capacitances of Q1 and Q2, this current (energy) is delivered to the load simultaneously and not just returned to the source as in pulse width modulation phase shifted topologies to significantly increase the efficiency of the present invention. Power transformer T1 operates at constant voltage on both the primary and secondary windings which lends itself to easier optimization, good cross regulation for multiple outputs, and use of synchronous rectification.

The present converter has numerous advantages, some of which are as follows:

(1) Q1 and Q2 operate a constant 50% duty cycle, thereby eliminating complicated pulse width modulation control circuits.

(2) No power is lost in Q1 and Q2 discharging and charging output capacitances C1 and C2.

(3) There is no bulky power consuming inductor on the output of the circuit.

(4) Transformer T1 operates at fixed voltages and duty cycle.

(5) Frequency variation of the gate drive for switching devices Q1 and Q2 is utilized.

(6) There is minimum noise and energy loss when commutating the output diodes and switching devices Q1 and Q2.

(7) The inductance Lx can be integrated into the power transformer T1 by intentionally increasing the leakage inductance on primary winding 38.

(8) Low switching noise is inherent since primary and secondary currents are triangular and continuous rather than trapezoidal or nearly square wave and discontinuous as occurs when pulse width modulation control is implemented.

(9) The control method is simple, efficient, inexpensive, reliable and occupies a very small area in volume.

(10) Since the transformer voltage is constant, it is simple to implement synchronous rectifiers on the output.

In summary, the above advantages lead to a dc-to-dc power converter that is compact, efficient, inexpensive, and has inherent low noise generation, high reliability, and is simpler to manufacture.

The performance of the incident invention at 300 volts input, 27.3 volts output at 500 watts output is reflected in the parameters given below for the embodiment shown in FIG. 1:

FET $R_{DS}$=0.25 OHMS
OUTPUT DIODE FORWARD VOLTAGE=0.7
PRIMARY TURNS=30
SECONDARY TURNS=6
PRIMARY RESISTANCE=0.033 OHMS
SECONDARY RESISTANCE=0.00156 OHMS
TRANSFORMER LEAKAGE INDUCTANCE=$12 \times 10^{-6}$ HENRYS POWER OUT=500 WATTS
EFFICIENCY=96.21%
PEAK PRIMARY CURRENT=7.32 AMPS
RMS PRIMARY CURRENT=4.22 AMPS
SWITCHING FREQUENCY=72.868 KHz
D.C. OUTPUT CURRENT=18.3 AMPS
SWITCHING LOSS=0.545 WATTS To increase the switching frequency, the power transformer T1 is wound such that the leakage inductance is less. For example, if the leakage inductance is reduced to $6 \times 10^{-6}$ henrys, the following results are obtained:

POWER OUT=500 WATTS
EFFICIENCY=96.13%
PEAK PRIMARY CURRENT=7.32 AMPS
RMX PRIMARY CURRENT=4.22 AMPS
SWITCHING FREQUENCY=145.7 KHz
DC OUTPUT CURRENT=18.3 AMPS
SWITCHING LOSS=1.09 WATTS

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A dc-to-dc power converter for delivering continuous and controlled power to a load, comprising:

first and second controllable switching devices having a junction therebetween, each of said first and second controllable switching devices including a parasitic gate to source capacitance, parasitic gate to drain capacitance, output capacitance and an intrinsic diode;

first and second power supplies having a junction therebetween;

a power transformer having a primary winding, a secondary winding and inductance in series with said primary winding, said secondary winding connected to a rectifying circuit connected to the load to supply a controllable current to the load, said primary winding connected between said junction between said first and second controllable switching devices and said junction between said first and second power supplies;

a first drive circuit connected to said first controllable switching device;

a second drive circuit connected to said second controllable switching device;

a drive transformer having a primary winding and first and second secondary windings, said first secondary winding connected to said first drive circuit, said second secondary winding connected to said second drive circuit;

a control circuit connected to said drive transformer primary winding for alternately actuating and deactuating said first and second drive circuits;

said first drive circuit actuating said first controllable switching device, such that said first drive circuit begins to charge the effective parasitic gate to source capacitance of said first controllable switching device without reaching the gate to source voltage threshold until current through said inductance and said primary winding of said power transformer discharges the effective output capacitance of said first controllable switching device, and thereafter said intrinsic diode of said first controllable switching device begins to conduct;

said second drive circuit actuating said second controllable switching device, such that said second drive circuit device begins to charge the effective parasitic gate to source capacitance of said second controllable switching device without reaching the gate to source voltage threshold until current through said inductance and said primary winding of said power transformer discharges the effective output capacitance of said second controllable switching device, and thereafter said intrinsic diode of said second controllable switching device begins to conduct; and said first and second controllable switching devices thereby continuously deliver controllable power to the load.

2. The converter of claim 1 wherein said control circuit operates to activate said first drive circuit while said second drive circuit is deactivated and operates to activate said second drive circuit while said first drive circuit is deactivated.

3. The converter of claim 1 wherein said inductance in series with said primary winding of said power transformer comprises leakage inductance.

4. The converter of claim 1 wherein said inductance in series with said primary winding of said power transformer comprises discrete inductance.

5. The converter of claim 1 wherein the first and second controllable switching devices comprise field effect transistors.

* * * * *